(12) United States Patent
van Oort et al.

(10) Patent No.: US 11,499,083 B2
(45) Date of Patent: Nov. 15, 2022

(54) METHOD FOR PLUGGING AND ABANDONING OIL AND GAS WELLS

(71) Applicants: Board of Regents, The University of Texas System, Austin, TX (US); PQ Corporation, Malvern, PA (US)

(72) Inventors: Eric van Oort, Bee Cave, TX (US); Michael McDonald, Toronto (CA)

(73) Assignees: Board of Regents, The University of Texas System, Austin, TX (US); PQ LLC, Malvern, PA (US)

(*) Notice: Subject to any disclaimer, the term of this patent is extended or adjusted under 35 U.S.C. 154(b) by 0 days.

(21) Appl. No.: 16/949,283

(22) Filed: Oct. 23, 2020

(65) Prior Publication Data
US 2021/0122966 A1   Apr. 29, 2021

Related U.S. Application Data

(60) Provisional application No. 62/925,287, filed on Oct. 24, 2019.

(51) Int. Cl.
   *C09K 8/42*   (2006.01)
   *C09K 8/46*   (2006.01)
   *E21B 33/14*  (2006.01)

(52) U.S. Cl.
   CPC ............ *C09K 8/426* (2013.01); *C09K 8/46* (2013.01); *E21B 33/14* (2013.01)

(58) Field of Classification Search
   CPC .................................................. E21B 43/24
   See application file for complete search history.

(56) References Cited

U.S. PATENT DOCUMENTS

| | | | | | |
|---|---|---|---|---|---|
| 3,620,302 | A | * | 11/1971 | Parsons | E21B 33/138 166/258 |
| 4,026,360 | A | * | 5/1977 | Drinkard | E21B 43/24 166/272.6 |
| 5,309,997 | A | * | 5/1994 | Nahm | C09K 8/145 507/140 |

(Continued)

FOREIGN PATENT DOCUMENTS

WO      20161177 A1      1/2018

OTHER PUBLICATIONS

E. van Oort et al., abstract, Simplifying Well Abandonments Using Shale As A Barrier, paper accepted for SPE/IADC Drilling Conference 2020, Galveston.

Enayatpour, S., Thombare, A., Aldin, M., and van Oort, E. (2019). Exploiting Shale Creep Deformation to Create Annular Barriers for Well Plugging and Abandonment: Experimental Investigation and Numerical Simulation, paper SPE 195966 to be presented at the 2019 SPE ATCE Conference, Calgary.

(Continued)

*Primary Examiner* — William D Hutton, Jr.
*Assistant Examiner* — Avi T Skaist
(74) *Attorney, Agent, or Firm* — Buchanan Ingersoll & Rooney PC (57) ABSTRACT

A method and agent to induce accelerated creep deformation of shale rock formations in the annular gap between a shale formation and non-cemented sections of a casing string have been developed. A fluid containing alkali silicate or a modified alkali silicate is added to the annular space between the shale rock formation and the casing string. The alkali silicate promotes creep deformation of the shale rock, effectively closing the annulus surrounding the casing. It has been found lithium silicate provides the strongest shale-casing bond and is the presently preferred material for closing abandoned wells.

6 Claims, 9 Drawing Sheets

(56) References Cited

U.S. PATENT DOCUMENTS

2015/0337194 A1* 11/2015 Ballard ................ C04B 28/32
106/806
2016/0237779 A1 8/2016 Husby et al.

OTHER PUBLICATIONS

Bauer, A., Stenebraten, J. F., Li, L., and Fjr, E., 2017. Can heating-induced creep result in shale barriers for P&A applications? American Rock Mechanics Association, (ARMA 17-818).
Fjær, E., Folstad, J. S., and Li, L., 2016. How creeping shale may form a sealing barrier around a well. American Rock Mechanics Association, (ARMA 16-482).
Holt, R. M., Fjær, E., and Larsen, I., 2017. Ultrasonic properties of creepy shales. American Rock Mechanics Association, (ARMA17-688).
International Search Report for PCT/US2020/056999 dated Feb. 5, 2021.
Written Opinion of the International Searching Authority for PCT/US2020/056999 dated Feb. 5, 2021.
"Evaluation of Shale Formations as Barrier Element for Permanent Plug and Abandonment of Wells", Kristian Mourn Skjerve, Norwegian University of Science and Technology.
"Identification and Qualification of Shale Annular Barriers Using Wireline Logs During Plug and Abandonment Operation", Stephen Williams, SPE, Turls Carisen, SPE, and Kevin Constable, SPE, StatoilHydro ASA, and Arne Guldahi, SPE, Schlumberger, SPE/IADC119321, Copyright 2009, SPE/IADC Drilling Conference and Exhibition.

* cited by examiner

METHOD FOR PLUGGING AND ABANDONING OIL AND GAS WELLS

CROSS-REFERENCE TO RELATED APPLICATIONS

This application is related to and claims the benefit of U.S. provisional application 62/925,287 titled "Method for Plugging and Abandoning Oil and Gas Wells" filed on Oct. 24, 2019, the entire contents of which are incorporated herein by reference.

BACKGROUND OF THE INVENTION

Field of the Invention

The present invention relates to fluids and methods for inducing creep deformation in clay-rich shale rock formations. The invention results in the deformed shale permanently closing the annular gap between the casing and the wellbore.

Description of Related Art

Figure 1:
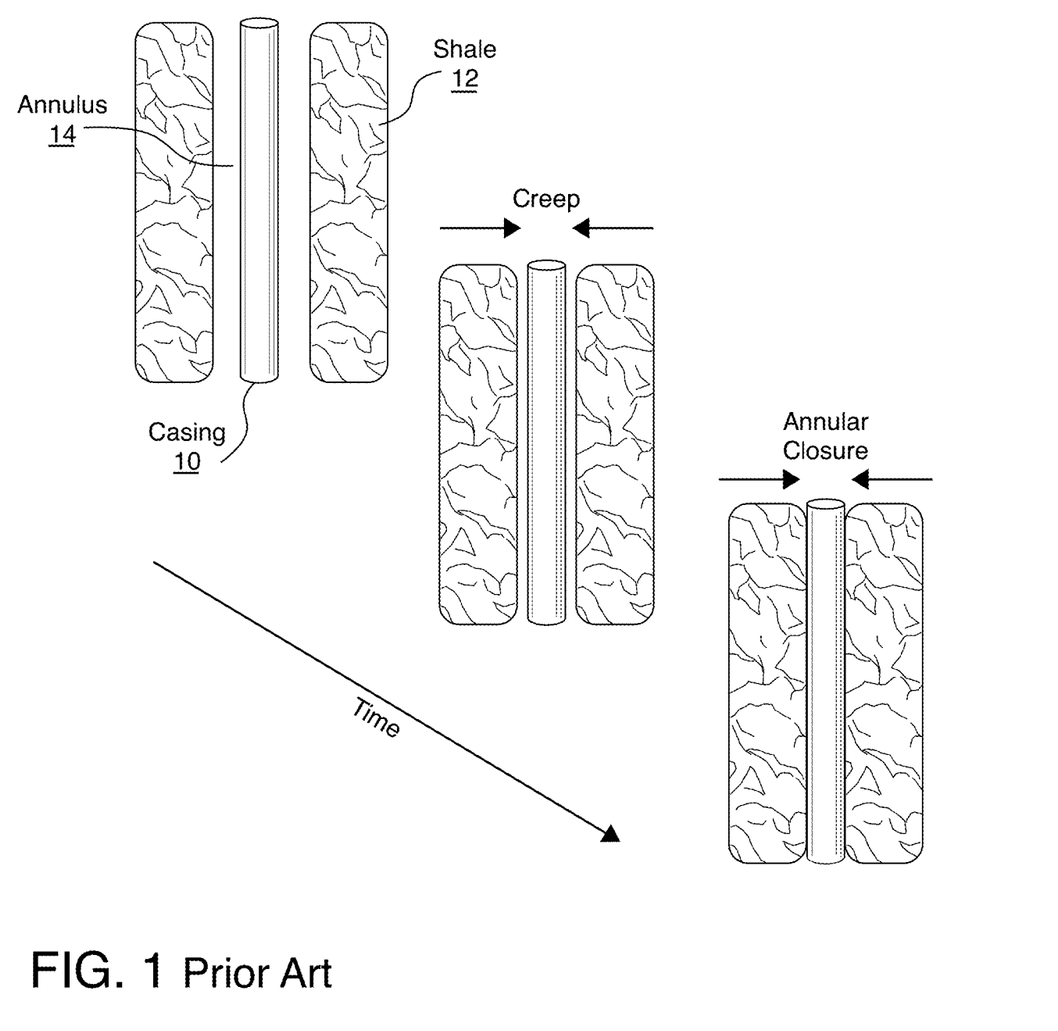
FIG. 1 is a schematic representation showing the annular closure formed by the deformation of the shale layer surrounding a well casing.

Well abandonment is one of the biggest challenges in the oil and gas industry, both in terms of cost and effort as well as the technical challenges associated with creating a permanent wellbore isolation. As shown in FIG. 1, casing 10 is provided through shale layer 12. An annulus 14 surrounds casing 10 and provides an opening for the flow of liquids and gas from lower regions of shale layer 12 to the surface. When a well is abandoned, permanent barriers are required inside and outside of the casing string to create zonal isolation and prevent the flow of liquids and gas through annulus 14. Current well abandonment technology requires the milling and/or cutting and pulling of casing strings to expose open hole formations, such that abandonment plugs (usually cement) can be set across them. This is a time-consuming and costly exercise, particularly when performed offshore, because it requires a drilling rig onsite to perform the operation.

Numerous techniques and materials have been used to form the permanent barriers. Ordinary Portland Cement (OPC) has long been used as a plugging material. OPC as a barrier material has several shortcomings, however. OPC is brittle and does not re-heal when cracked. It is easily contaminated by oil and oil-based drilling fluids. Furthermore, it has relatively low tensile strength and low strength when bonding to rock formations and casing. Moreover, the production of OPC is the second largest source of $CO_2$ emissions in the world.

The placement of OPC or cement replacement outside of the uncemented sections of casing string that have been left uncemented is an expensive and time- and labor-intensive process, particularly offshore. Placement often requires casing milling and pulling before abandonment plugs can be set and often requires the use of a drilling rig, at significant additional cost to the oil and gas well operator.

Figure 2:
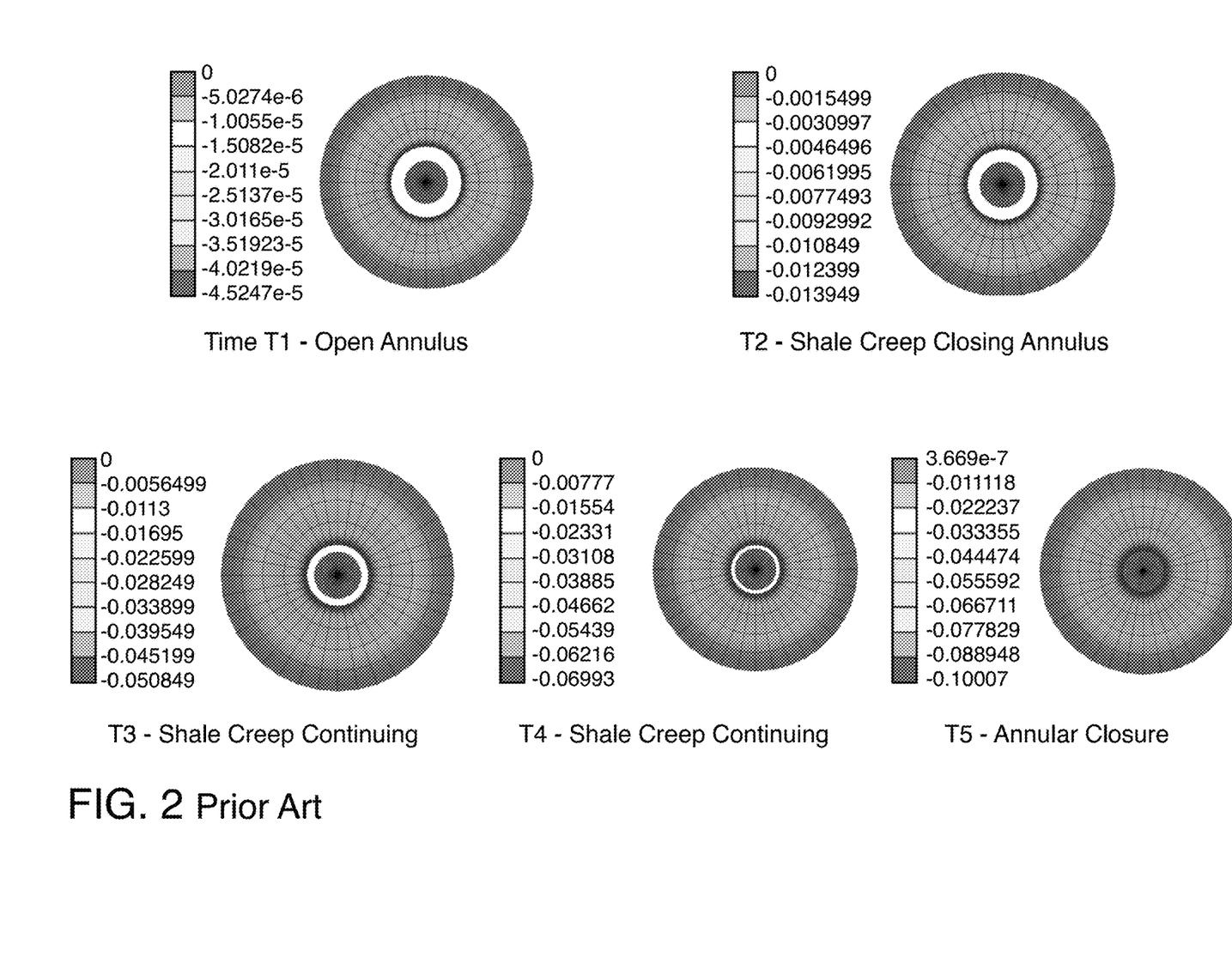
FIG. 2 is a horizontal cross-sectional schematic representation showing the annual closure formed by the deformation of the shale layer surrounding a well casing.
Figure 3:
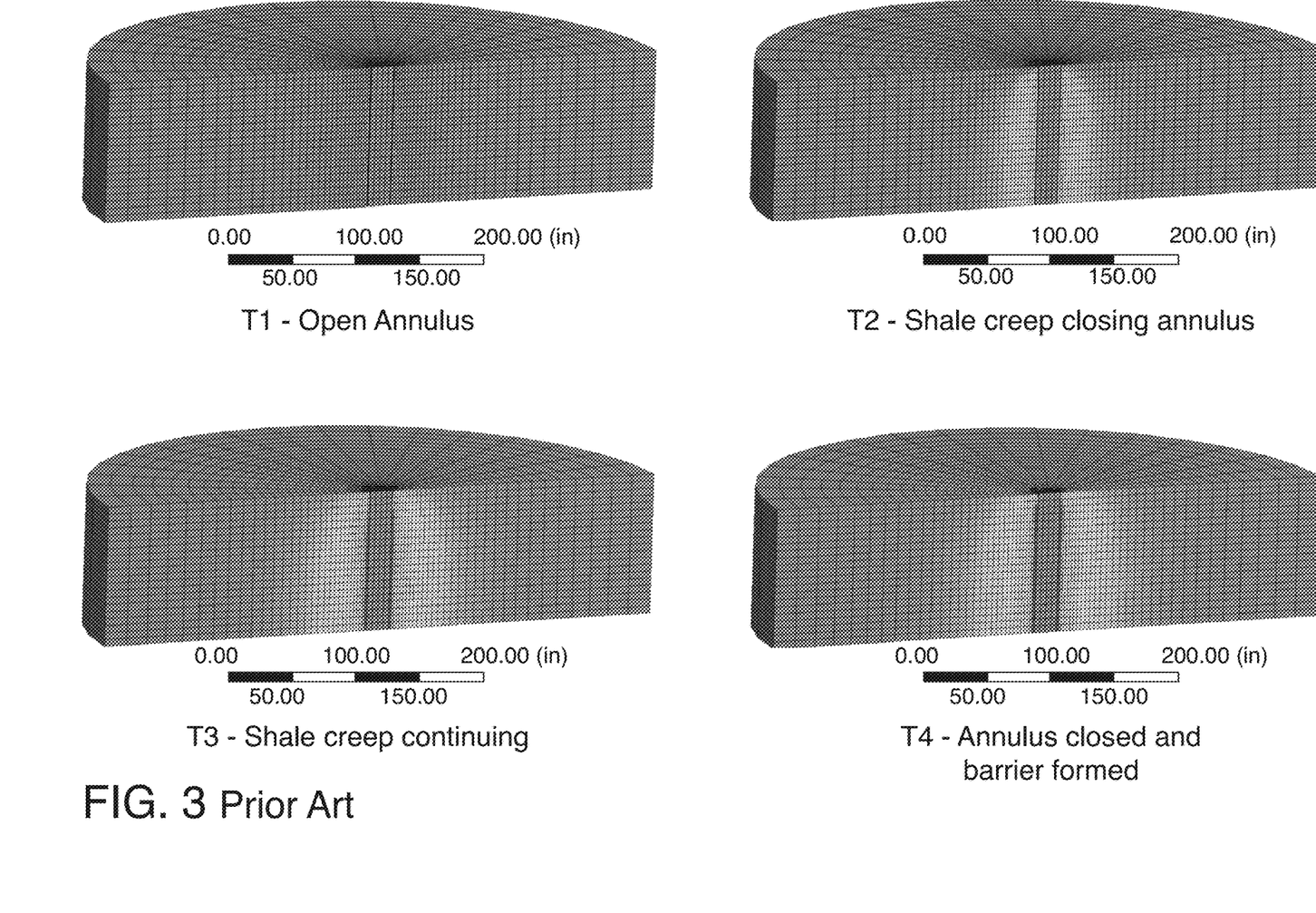
FIG. 3 is a vertical cross-sectional schematic representation showing the annual closure formed by the deformation of the shale layer surrounding a well casing.

As shown in FIGS. 1-3, it is possible to use natural shale formations as barriers in oil and gas wells for zones left uncemented behind casing strings 10. Certain shales 12 have the ability to plastically deform and "creep" into wellbore and annular spaces 14 under certain pressure, temperature and fluid conditions. If this happens in an annular space 14, this annular space 14 can be blocked off completely and a barrier may be formed that prevents migration of any gases or fluids from deep formations.

Shale represents a more effective barrier material than cement as demonstrated by eons of isolation of oil and gas producing zones prior to drilling and production. Shales form cap rocks on top of hydrocarbon-bearing zones, sealing them in and preventing migration of hydrocarbons and other fluids and gases to the surface. The disadvantage to using shale as a barrier material is that it most often requires an unacceptable long time to naturally deform under in-situ rock stress and pressure. However, lowering the near-wellbore stiffness of the rock accelerates the deformation and creep of the shale into an uncemented annular space and forms an effective barrier in that space, thereby reducing the time required for deformation.

To create an effective barrier, the shale must not only deform, but the desirable sealing properties must not be lost in the deformation process. The final barrier must prevent the flow of formation gases and fluids to the surface.

It is known that rock stiffness can be manipulated and effectively lowered by temperature increase, annular pressure reduction, and by exposure to certain annular fluids.

It would be operationally challenging and costly to apply and maintain sufficient elevated temperature across an annular space or reduce the pressure in it to induce shale deformation. The exposure of the shale to an annular fluid represents an easier and more cost effective option that could be done without using a drill rig.

Shales can swell, deform, and disintegrate upon exposure to different fluids. When drilling a well, great care is taken to formulate and run appropriate drilling fluids that will stabilize shale and prevent hole collapse while drilling. Water-based drilling fluids such as alkali silicates have been found to be effective for providing shale stabilization is alkali silicates. Alkali silicates are one of the few water-based fluids that can match the shale inhibition properties of oil-based drilling fluids. Alkali silicates have been used in drilling fluids for shale stabilization, encapsulation, and prevention of lost circulation, as well as additives in non-aqueous drilling fluids such as oil-based muds and synthetic-based muds.

The use of alkali silicates for creating annular shale barriers is not obvious. In the literature, it is known that alkali silicates can protect shale formations and prevent them from destabilizing during drilling operations when such alkali silicates are used in the drilling fluid. The fact that alkali silicates can promote shale creep and accelerate the creep deformation of shale material into an annular space is therefore counterintuitive

SUMMARY OF THE INVENTION

It has been discovered that alkali silicates and modified alkali silicates offer a novel and unexpected method for inducing shale creep deformation in shale. These alkali silicates can create a reliable, high strength hydraulic seal. Further, these alkali silicates can induce creep deformation and creation of a permanent seal in a wide range of shale types.

It was unexpected that alkali silicate and modified alkali silicates would be highly effective at inducing shale creep deformation that could be harnessed to expedite the formation of shale as a barrier. These particular forms of alkali silicate yield a sealing material better able to isolate pressure, gas and fluids.

It has been found that different alkali silicates perform better with various shale types. For instance, lithium silicate has unexpectedly been found to promote creep in shales and accelerated barrier formation from North Sea Miocene shales, and induce accelerated dispersion of various Canadian shales. Lithium silicate outperformed other alkali silicate materials for the purpose of shale annular barrier formation

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention provides a method for placing a fluid that will induce the deformation and creep of shale opposite subterranean rock formation. The deformed shale will have improved sealing properties due to the presence of alkali silicate such as lithium silicate.

The annular deformation fluid comprises alkali silicates. These silicates can be in the form of lithium silicate, sodium silicate, potassium silicate, or a combination. The alkali silicate is usually in liquid form but can be a dissolvable solid. An example of a suitable type of lithium silicate is Lithisil®25.

Suitable lithium-based products such as lithium hydroxide, lithium chloride, and lithium carbonate, may also be added to alkali silicates such as sodium silicate or potassium silicate. This fluid can impart accelerated shale creep and create an effective seal.

One of the most desirable properties in an abandoned well seal is the quality of the shale-casing bond after shale creep has occurred and how much differential pressure it can hold. It has been found that holes closed with lithium silicate can withstand significantly higher pressure before re-opening than holes closed with sodium silicate. For example, in SAAB tests, it was found that although both lithium silicate and sodium silicate had similar closure times, the re-opening pressure for sodium silicate was 450 psi and the re-opening pressure for lithium silicate was 943 psi. Because it produces a stronger shale-casing bond, lithium silicate is the presently preferred material for SAAB barrier creation.

The present invention will be described in connection with the following examples where lithium silicate has been used as the creep deformation agent. It is to be understood that sodium silicate and potassium silicate can also be used for other types of shale.

Experiment 1

Figure 4:
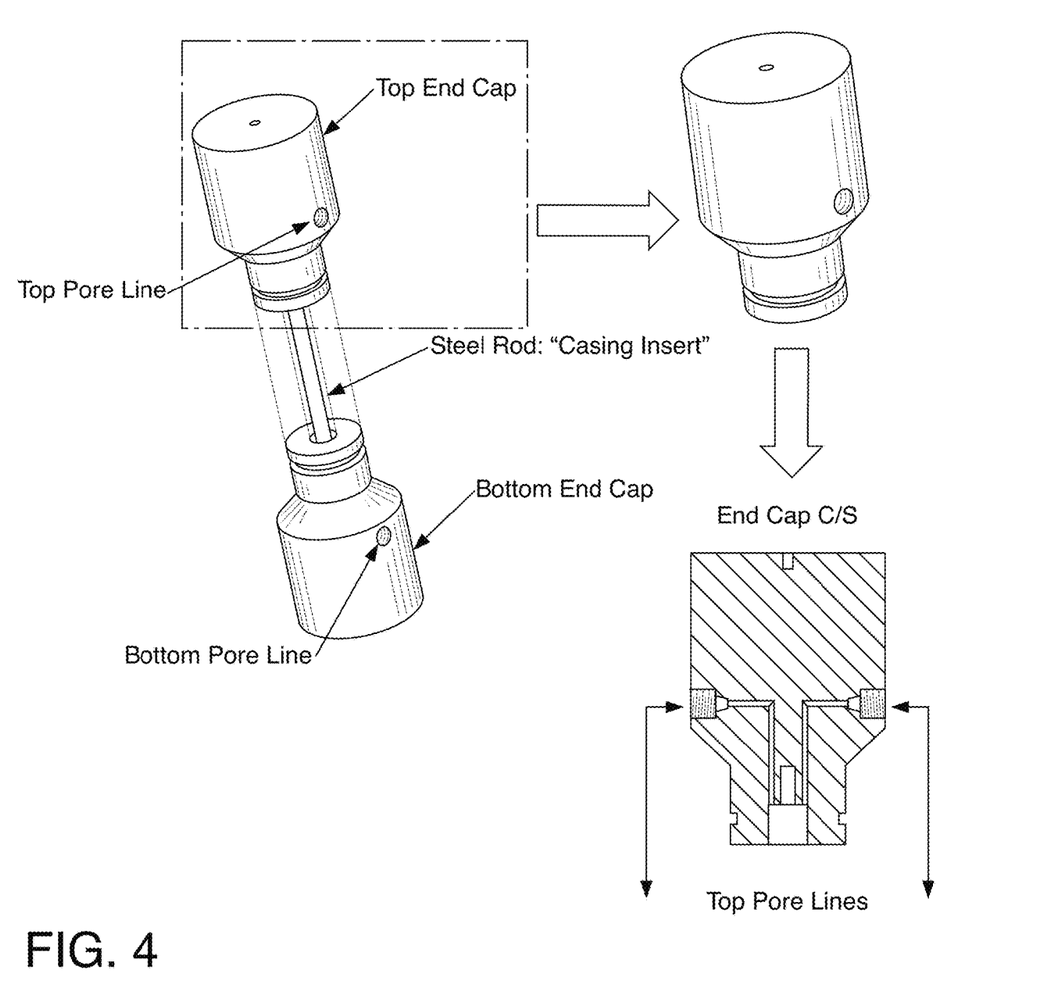
FIG. 4 is a schematic representation of the test set-up used in Experiment 1 to demonstrate the present invention.
Figure 5:
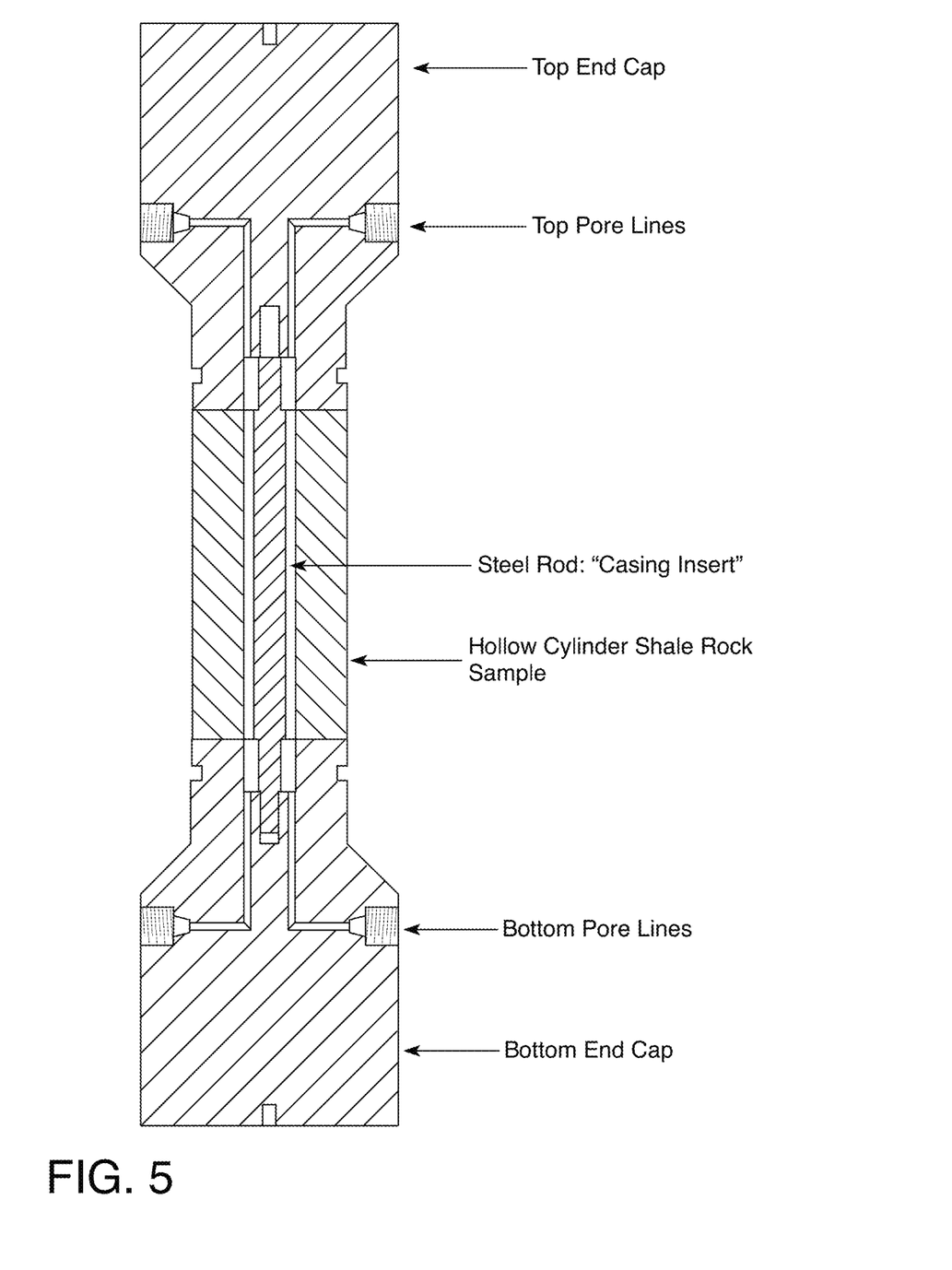
FIG. 5 is a vertical cross section of the schematic representation of the test set-up of FIG. 4.
Figure 6:
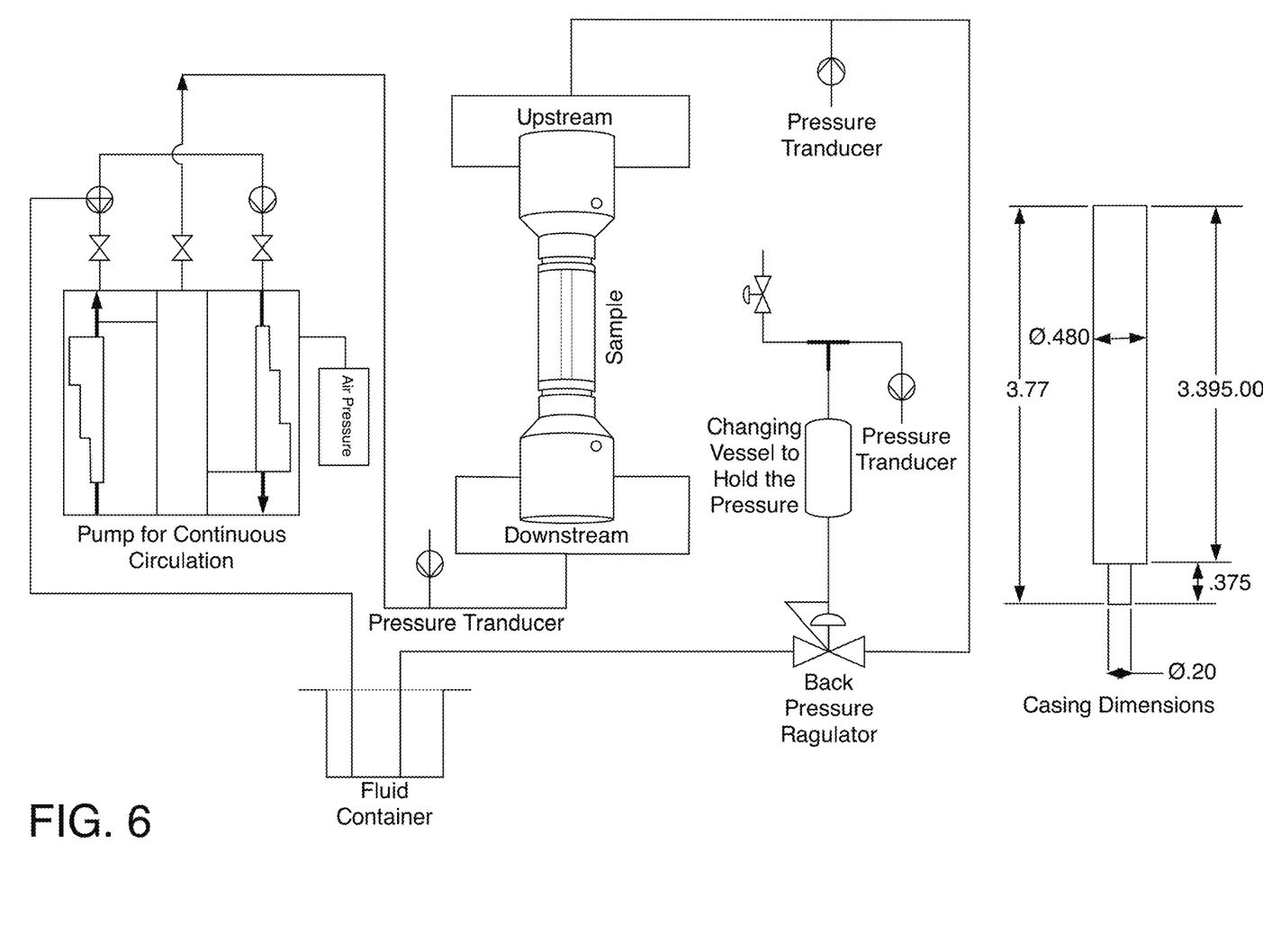
FIG. 6 is a schematic representation depicting the operation of the test set-up of FIG. 4.
Figure 7:
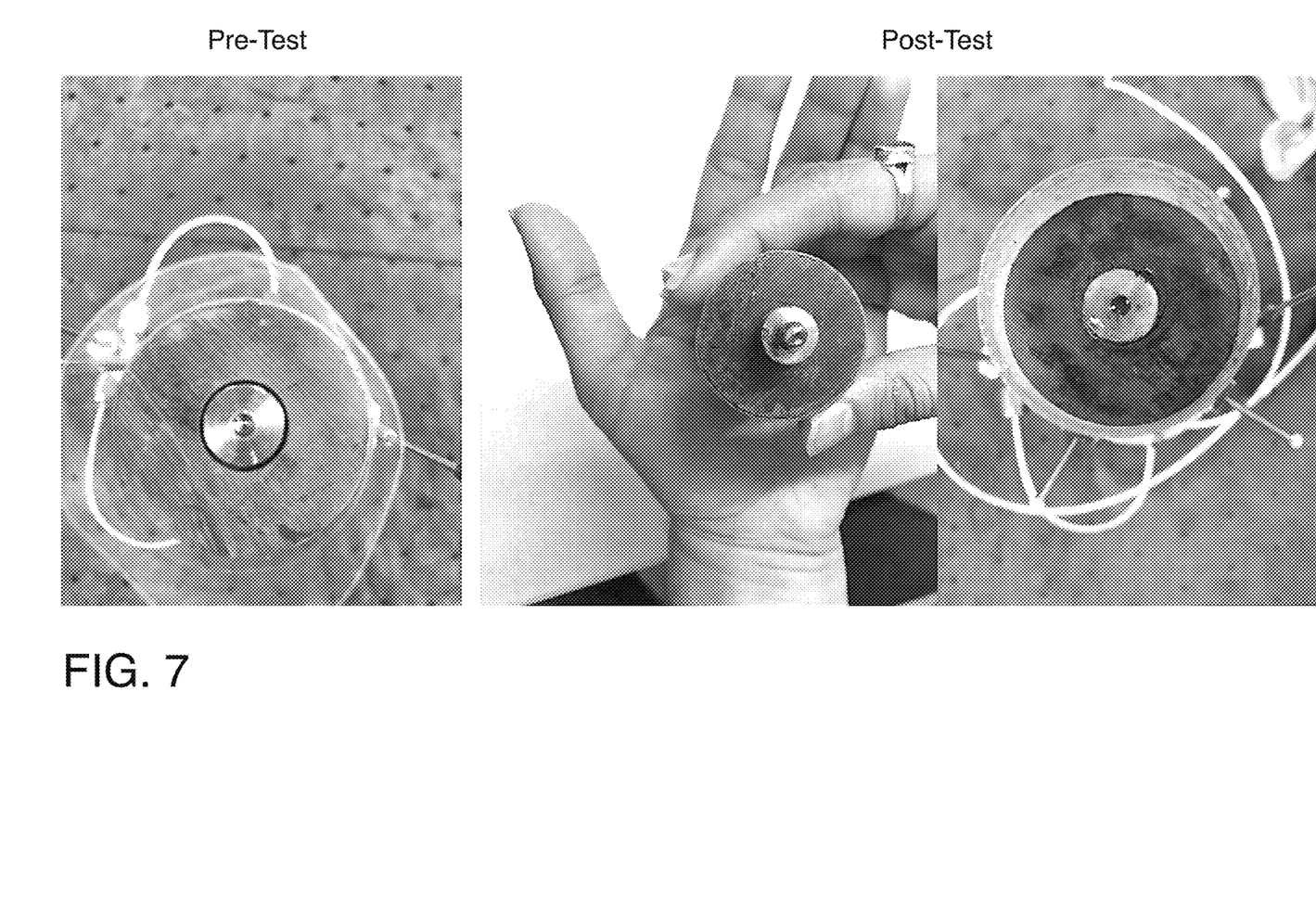
FIG. 7 is a collection of photographs depicting the annular gap between the casing string and shale layer before and after the testing described in Experiment 1.
Figure 8:
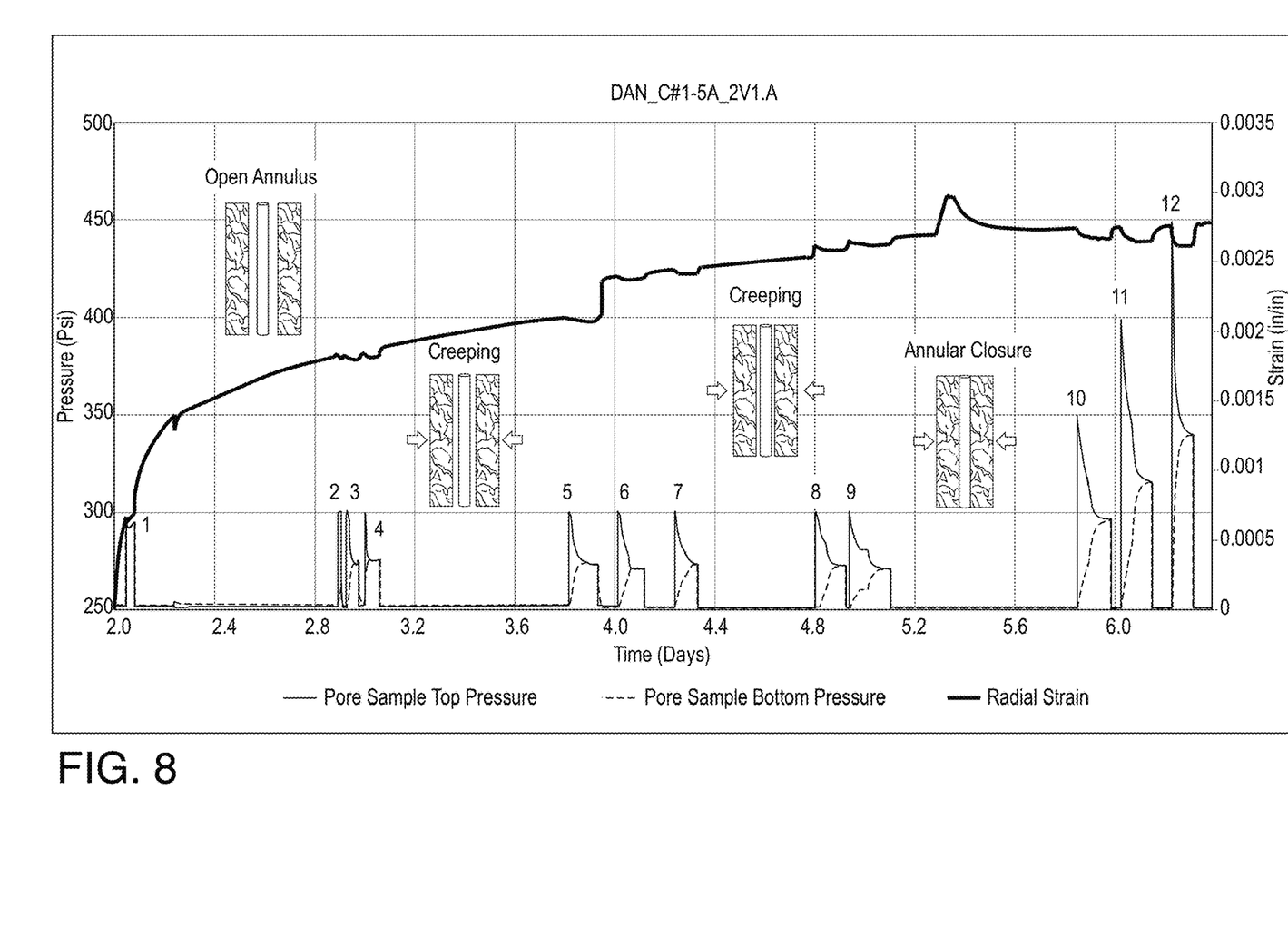
FIG. 8 shows the progress of the closure of the annular gap resulting from the shale deformed by various alkali silicates used in the testing described in Experiment 1.
Figure 9:
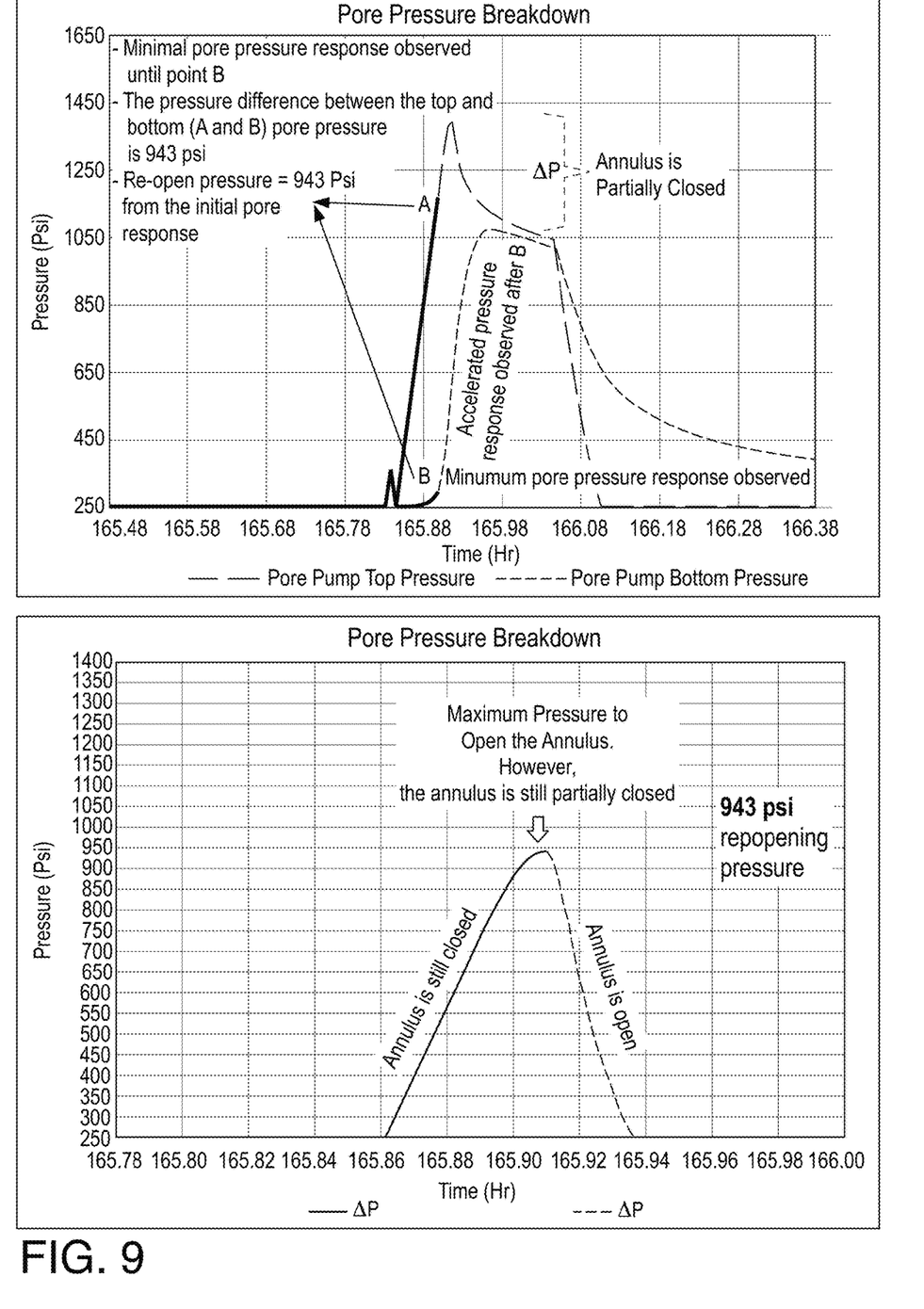
FIG. 9 shows the results of pressure tests performed on shale deformed by various alkali silicates used in the testing described in Experiment 1.

The effectiveness of lithium silicate to expedite shale creep deformation was demonstrated in dedicated, large-scale rock mechanical tests. In these tests, cylindrical shale sample (1.5 inch in diameter, 3 inch in length) from a North Sea shale formation were confined at downhole stress, pressure and temperature conditions. FIGS. 4-6 depict the equipment that was used in these tests. As shown in FIGS. 4 and 5, an artificial casing string was placed on the inside of the shale cylinder, leaving an annular gap between the rock and the casing. This set-up represents a miniaturized version of the actual situation in the field, with a casing string being left uncemented opposite a shale formation with an annular clearance that is filled in by creep deformation of the shale (FIG. 7). Using radial strain measurements and pressure pulse decay cycles, the closure of the annular gap was characterized throughout the experiments (FIG. 8). At the end of the test, the barrier quality of the shale material was probed by raising the downstream pressure and observing breakthrough on the upstream side (FIG. 9). The results that were obtained when varying the annular fluid chemistry and experimental conditions are set forth in Table 1 below:

TABLE 1

| Experimental Conditions | Annular Closure Time | Breakthrough Pressure |
|---|---|---|
| Annular gap filled with artificial pore fluid, temperature 55° C. | 18.4 days | Not tested |
| Annular gap filled with 2M NaOH fluid (pH = 12), temperature 55° C. | No annular closure observed | Not observed (open annular space) |
| Annular gap filled with artificial pore fluid, temperature 85° C. (elevated temperature) | 11.5 days | 724 psi |
| Annular gap filled with 10% v/v Lithium Silicate solution, temperature 55° C. | 3.8 days | 943 psi |
| Annular gap filled with 10% v/v Sodium Silicate solution, temperature 55° C. | 5.1 days | 1054 psi |

The results of this experiment show that the use of alkali silicates such as lithium silicate and sodium silicate substantially reduces the time required for the shale to deform and fill the annular gap around the well casing as compared with other fluids at the same or higher temperatures. The seal that was formed with the lithium silicate and sodium silicate were stronger (with a breakthrough pressure of 943 psi and 1054 psi respectively, approximately equal within the ±100 psi accuracy of the test) than that achieved through the use of elevated temperature (with a breakthrough pressure of only 724 psi). The seal with the lithium silicate formed more quickly (3.8 days) than that with the sodium silicate (5.1 days), with the elevated temperature (11.5 days) and in the base test with artificial pore fluid (18.4 days).

Experiment 2

The impact of lithium on shale was compared against conventional sodium silicate and potassium silicate using commonly drilled dispersive type shale found in Western Canada. Shale dispersion was measured by placing 30 g of the indicated shale type in a low concentration of the indicated alkali silicate that was diluted volume-to-volume with tap water. The samples were hot rolled for 16 hours at 49° C. (120° F.). After hot rolling, the samples were screened through a 16 mesh filter and rinsed with tap water. Samples were dried and weighed.

Table 2 below shows the shale recovery after hot rolling.

TABLE 2

| Shale Name | % vol/vol alkali silicate/water | Potassium Silicate Kasil ® 1 | Potassium Silicate (Kasil ® 1 + LiOH) (95:5 wt/wt) | Sodium Silicate N ® grade | Lithium Silicate Lithisil ®25 |
|---|---|---|---|---|---|
| Shaftesbury | 2.5% | 47.3 | 62.8 | 39.7 | 35 |
| Joli Fou | 2.5% | 51.7 | 46.0 | 21. | 3.3 |
| Lea Park | 5.0% | 48.7 | 10.1 | 6.2 | 0 |
| White Spec | 5.0% | 11.3 | 49.3 | 6.3 | 0 |

For drilling purposes, it is imperative that shales are stabilized, and hence obtaining high values for the shale recovery percentage during hot-rolling is considered advantageous. However, for the shale-as-a-barrier application, obtaining lower numbers is more beneficial, as it will lead to a larger strength reduction, and concomitantly a higher creep rate, of the shale material. It is clear from Table 2 above that lithium silicate has the lowest shale recovery percentages of the various materials tested, and is the most suitable material to induce enhanced shale creep.

Various modifications and alterations to this invention will become apparent to those skilled in the art. The amount of bentonite in the thermoplastic composition can be adjusted to modify the "clump" force, suitable to avoid clumping of the pellets in any adverse storage conditions.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

We claim:

1. A method for promoting creep deformation of shale surrounding a well casing comprising the step of introducing a lithium-based product in aqueous form into an annulus between said shale and said well casing, wherein said lithium-based product is one of lithium hydroxide, lithium carbonate, or lithium chloride, whereby said lithium-based product directly contacts the shale to promote the creep deformation of the shale, thereby sealing the annulus and creating an effective seal between the shale and the well casing.

2. The method of claim 1 wherein said lithium-based product is introduced in aqueous form.

3. The method of claim 1 wherein said lithium-based product further comprises lithium silicate.

4. The method of claim 1 wherein said creep deformation of the shale fully closes said annulus.

5. The method of claim 1 wherein said lithium-based product is added to sodium silicate.

6. The method of claim 5 wherein said lithium-based product further comprises a modified lithium silicate.

* * * * *